United States Patent
Aberle et al.

(10) Patent No.: US 8,997,965 B2
(45) Date of Patent: Apr. 7, 2015

(54) FRICTION CLUTCH DEVICE

(71) Applicant: Schaeffler Technologies AG & Co. KG, Herzogenaurach (DE)

(72) Inventors: Sebastian Aberle, Gutach (DE); Patrick Weydmann, Buehl (DE); Gerhard Gander, Buehlertal (DE); Alexander Obitz, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 149 days.

(21) Appl. No.: 13/655,030

(22) Filed: Oct. 18, 2012

(65) Prior Publication Data

US 2013/0092497 A1    Apr. 18, 2013

(30) Foreign Application Priority Data

Oct. 18, 2011   (DE) .......................... 10 2011 084 658

(51) Int. Cl.
*F16D 13/71*  (2006.01)
*F16D 13/58*  (2006.01)

(52) U.S. Cl.
CPC .............. *F16D 13/585* (2013.01); *F16D 13/71* (2013.01)

(58) Field of Classification Search
CPC ....................................... F16D 13/44
USPC ................................ 192/89.22, 89.23, 89.24
See application file for complete search history.

(56) References Cited

U.S. PATENT DOCUMENTS

| | | | | |
|---|---|---|---|---|
| 2,641,344 A | * | 6/1953 | Banker ...................... | 192/70.27 |
| 3,389,768 A | * | 6/1968 | Cook .......................... | 192/89.22 |
| 4,602,708 A | * | 7/1986 | Nagano ...................... | 192/89.23 |
| 5,671,834 A | * | 9/1997 | Mizukami et al. ......... | 192/89.23 |
| 5,730,267 A | * | 3/1998 | Lopez ........................ | 192/89.23 |
| 5,967,284 A | * | 10/1999 | Mizukami .................. | 192/89.23 |

FOREIGN PATENT DOCUMENTS

DE   10 2008 005 918 A1   8/2008
DE   10 2010 051 253 A1 * 6/2011

* cited by examiner

*Primary Examiner* — Rodney H Bonck
(74) *Attorney, Agent, or Firm* — Davidson, Davidson & Kappel, LLC

(57) ABSTRACT

A friction clutch device, in particular for a drive train of a motor vehicle which is driven by internal, combustion engine, having a rotational axis, a housing, at least one pressure plate which can be displaced in the direction of the rotational axis relative to the housing for an actuation, and a spring device for loading the at least one pressure plate, in which friction clutch device the spring device has a first element for generating a pressure force which acts on the at least one pressure plate, and a second element which is separate structurally from the first element for transmitting an actuating force, in order to improve the friction clutch structurally and/or functionally.

20 Claims, 2 Drawing Sheets

FRICTION CLUTCH DEVICE

CROSS-REFERENCE TO RELATED APPLICATIONS

The present application claims priority of DE 10 2011 084 658.1, filed Oct. 18, 2011, the priority of this application is hereby claimed and this application is incorporated herein by reference.

BACKGROUND OF THE INVENTION

1. Field of the Invention

The invention relates to a friction clutch device, in particular for a drive train of a motor vehicle which is driven internal combustion engine, having a rotational axis, a housing, at least one pressure plate which can be displaced in the direction of the rotational axis relative to the housing for an actuation, and a spring device for loading the at least one pressure plate.

2. Description of the Related Art

DE 10 2008 005 918 A1 has disclosed a friction clutch having a housing, a pressure plate and an energy store which can be stressed between the housing and the pressure plate and via, which the pressure plate can be loaded in the closing direction of the friction clutch. The energy store is formed by a disk spring. The disk spring is fastened to and supported on the housing via an abutment in the manner of a two-arm lever. The disk spring can be elastically stressed axially between the housing and the pressure plate, with the result that it loads said pressure plate in the direction of the friction linings of a clutch plate. In order to disengage the clutch, the disk spring has to be loaded in the region of the tips of the disk spring tongues.

SUMMARY OF THE INVENTION

An object of the present invention is to provide a friction clutch that improves structurally and/or functionally over the prior art.

The object is achieved by a friction clutch device, in particular for a drive train of a motor vehicle which is driven by internal combustion engine, having a rotational axis, a housing, qt least one pressure plate which can be displaced in the direction of the rotational axis relative to the housing for an actuation, and a spring device for loading the at least one pressure plate, in which friction clutch device the spring device has a first element for generating a pressure force which acts on the at least one pressure plate, and a second element which is separate structurally from the first element for transmitting an actuating force.

The friction clutch device can have a single clutch. The friction clutch device can have a double clutch. The friction clutch device can have a dry clutch. The friction clutch device can have a single plate clutch. The friction clutch device can have a wet clutch. The friction clutch device can have a multiple plate clutch. The friction clutch device can be arranged in a drive train of a motor vehicle. The motor vehicle can be a commercial vehicle. The motor vehicle can be an agricultural utility vehicle, such as a tractor. The motor vehicle can have an internal combustion engine. The motor vehicle can have a transmission. The friction clutch device can be arranged between the internal combustion engine and the transmission. The friction clutch device can have an input part. The input part can be capable of being driven by the internal combustion engine. The friction clutch device can have at least one output part. The transmission can be capable of being driven with the aid of the at least one output part. The friction clutch device can make driving off and changing of a transmission gear ratio possible.

Starting from a completely disengaged actuating position, in which substantially no power transmission takes place between the input part and the at least one output part, and moving as far as a completely engaged actuating position, in which substantially complete power transmission takes place between the input part and the at least one output part, the friction clutch device can make an increasing power transmission possible in a manner which is dependent on the actuation, it being possible for power transmission to take place frictionally between the input part and the at least one output part. Conversely, starting from a completely engaged actuating position, in which substantially complete power transmission takes place between the input part and the at least one output part, and moving as far as a completely disengaged actuating position, in which substantially no power transmission takes place between the input part and the at least one output part, a decreasing power transmission can be made possible in a manner which is dependent on the actuation. A completely engaged actuating position can be a closed actuating position. A completely disengaged actuating position can be an open actuating position.

A double clutch can have a first output part and a second output part. With the aid of the double clutch, the input part on one side and the first output part and/or the second output part on the other side can be connected to one another or can be disconnected from one another. In addition, a power flow from the input part can be moved in a fading change from the first output part to the second output part and vice versa.

The at least one pressure plate can be connected fixedly to the housing so as to rotate with it. The friction clutch device can have a back-pressure plate. The backpressure plate can be connected fixedly to the housing so as to rotate with it. The back-pressure plate can be connected to the housing in an axially fixed manner. The pressure plate can be displaceable relative to the back-pressure plate. The friction clutch device can have two pressure plates. One of the two pressure plates can be an intermediate pressing plate. The intermediate pressing plate can be connected fixedly to the housing so as to rotate with it. The intermediate pressing plate can be capable of being displaceable axially with respect to the housing. The pressure plate can be displaceable relative to the intermediate pressing plate. A single clutch can have a pressure plate and a back-pressure plate. A double clutch can have a first pressure plate, a second pressure plate which is an intermediate pressing plate, and a back-pressure plate.

The friction clutch device can have at least one clutch plate. The input part of the friction clutch device can have the housing, the at least one pressure plate and the back-pressure plate. The at least one output part of the friction clutch device can have the at least one clutch plate. The at least one clutch plate can be capable of being clamped between the pressure plate and the back-pressure plate. The at least one clutch plate can be capable of being clamped between the first pressure plate and the second pressure plate which is an intermediate pressing plate. The at least one clutch plate can be capable of being clamped between the second pressure plate, which is an intermediate pressing plate, and the back-pressure plate. The at least one clutch plate can have friction linings. A lining suspension system can be arranged between the friction linings of the at least one clutch plate.

The spring device can load the at least one pressure plate in a prestressed manner in the engagement direction. The friction clutch device can have an automatically closing clutch. The spring device can load the at least one pressure plate in a prestressed manner in the disengagement direction. The friction clutch device can have an automatically opening clutch. The friction clutch device can have a push type clutch. The friction clutch device can have a pull type clutch.

An actuation of the friction clutch device can take place with the aid of an actuating device. The actuating device can act on the second element. The actuating device can have an actuating bearing, such as a disengagement bearing. The actuating bearing can act on a radially inner section of the second element. The actuating bearing can have an annular shape.

An actuation on a large diameter is made possible by way of the friction clutch device according to the invention. A greater transmission ratio can be realized. A pressing force can be increased. A greater wear reserve can be provided.

The first element can be a disk spring which acts between the housing and the at least one pressure plate. The disk spring can have no tongues or only very short tongues. A large amount of installation space is available for a force edge of the disk spring. The disk spring has an enlarged force edge. High pressing forces can therefore be generated. High stress peaks are avoided in the force edge. The disk spring has a long characteristic curve profile. The disk spring can be configured to be adapted largely independently of a transmission ratio of the friction clutch device.

Rivets can be arranged on the housing and the rivets can serve to center the disk spring. Starting from the housing, the rivets can be directed inwardly toward the disk spring. Instead of the rivets, the housing can have pin-shaped projections. The projections can be connected, for example screwed or welded, to the housing in a nonpositive, positive and/or material-to-material manner. The rivets can bear against a radially inner edge section of the disk spring. The disk spring can be secured against rotation with the aid of the rivets.

The friction clutch device can have an actuating device, and the second element can have at least one lever which acts between the actuating device and the at least one pressure plate. A transmission ratio of the friction clutch device in the case of an actuation is fixed with the aid of the at least one lever. The transmission ratio of the friction clutch device can be set largely independently of a pressing force.

Radially on the inner side, the at least one pressure plate can have a groove, into which the at least one lever engages. The at least one lever can engage at least virtually without play into the groove of the at least one pressure plate. There is therefore a secure connection between the at least one lever and the at least one pressure plate, both in the engagement direction and in the disengagement direction.

Rivets can be arranged on the housing, and the second element can be arranged on the rivets. The second element is held on the rivets and can pivot on the rivets in the case of an actuation.

The first element can act on the at least one pressure plate on a first diameter and the second element can act on said at least one pressure plate on a second diameter, and the first diameter can be greater than the second diameter. A large area and a favorable lever ratio are therefore available, in order to apply a high pressing force.

A resilient pivoting bearing element can be arranged between the first element and the second element. The pivoting bearing element can be an undulating wire ring. A play in the direction of the rotational axis of the friction clutch device can therefore be minimized. Vibrations, in particular in an unactuated state, can be damped.

Rivets with rivet heads can be arranged on the housing, and a pivoting bearing element can be arranged between the first element and the housing and a pivoting bearing element can be arranged between the second element and the rivet heads. The pivoting elements can be wire rings.

In summary and described in other words, the result of the invention is therefore, inter alia, a sheet metal cover single clutch with a disk spring and disengagement lever or disengagement lever spring and/or a tractor double clutch on the basis of a sheet metal cover single clutch with a disk spring which is riveted onto the cover.

The clutch can consist of a sheet metals cover single clutch. The disk spring can have no tongues or only very short tongues. The disk spring can be clamped between the cover and the pressure plate and can therefore generate a pressing force on a pressure plate. The disk spring can be centered on an outer edge of a force edge via the pressure plate and can be secured against rotation by the sheet metal cover, for example by rivet pins in the sheet metal cover. Securing against rotation can be omitted in the case of a disk spring without tongues. An actuation of the clutch can take place via disengagement lever/lever spring; the disengagement lever/the lever spring can bring about a transmission ratio of the clutch. The disengagement lever/lever spring can be positioned via rivets on the cover of the single clutch. The disengagement lever/lever spring can have a wire ring as pivot point. Said wire ring can be supported on the rivets. The disengagement lever/lever spring can engage without play into groove of the pressure plate and, in the case of an actuation of the clutch, the disengagement lever/the lever spring can ensure a requested lift as a result. A resilient element, for example an undulating wire ring, can be situated between the disengagement lever/lever spring and the disk spring, in the region of an inner force edge of the disk spring, which undulating wire ring prevents axial play and therefore vibrations of the disengagement lever/the lever spring in the unactuated state.

In the following text, one exemplary embodiment of the invention will be described in greater detail with reference to figures. Further features and advantages result from this description. Concrete features of this exemplary embodiment can represent general features of the invention. Features of this exemplary embodiment which are associated with other features can also represent individual, features of the invention.

The various features of novelty which characterize the invention are pointed out with particularity in the claims annexed to and forming a part of the disclosure. For a better understanding of the invention, its operating advantages, specific objects attained by its use, reference should be had to descriptive matter in which there are described preferred embodiments of the invention.

DETAILED DESCRIPTION OF THE PREFERRED EMBODIMENTS

Figure 1:
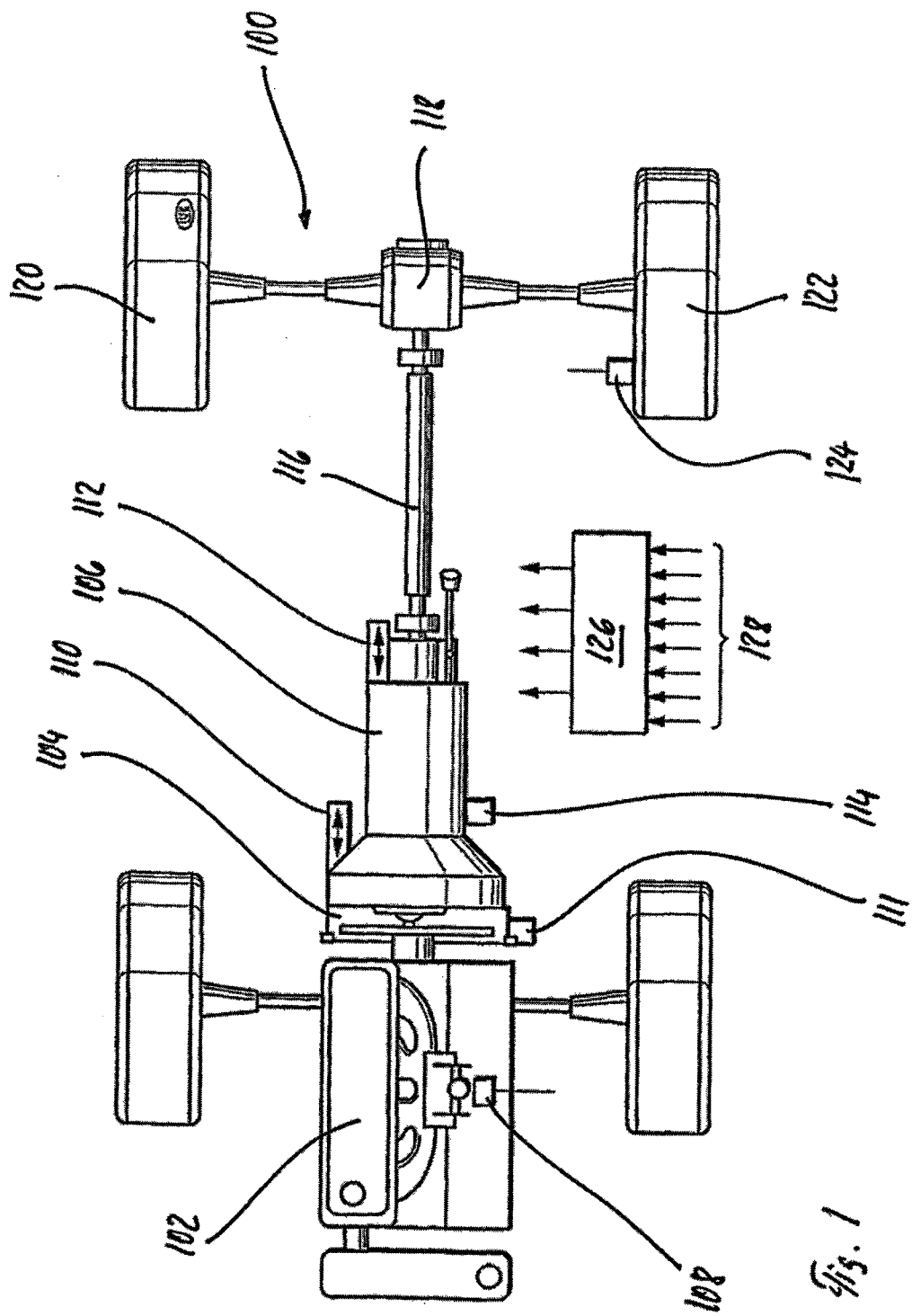
FIG. 1 shows a drive train of a motor vehicle having internal combustion engine, a clutch and a transmission.

FIG. 1 shows a drive train 100 of a motor vehicle having an internal combustion engine a clutch 104 and a transmission 106. The internal combustion engine 102 serves to drive the motor vehicle. The motor vehicle is an agricultural utility vehicle, such as a tractor. The internal combustion engine has a rotational speed sensor 108 for determining an internal combustion engine rotational speed.

Starting from the internal combustion engine 102, the clutch 104 is arranged so as to follow the internal combustion engine 102 in the drive power flow direction. The clutch 104 is a friction clutch. The clutch is a single clutch. The clutch 104 has an input part and an output part. The part of the clutch 104 is drive connected to the internal combustion engine 102. The output part of the clutch 104 is drive connected to the transmission 106. An actuating device 110 is provided for actuating the clutch 104. A sensor 111 serves to determine an actuating state of the clutch 104.

The transmission 106 is arranged so as to follow the clutch 104 in the drive power flow direction. The transmission 106 has a plurality of shiftable transmission stages. An actuating device 112 is provided for shifting the transmission stages. A sensor 114 serves to determine a set transmission stage. An output shaft of the transmission 106 is drive connected to a cardan shaft 116. Drive wheels 120, 122 of the motor vehicle can be driven with a differential 118 connected in between. A rotational speed sensor 124 is provided for detecting a drive wheel rotational speed.

The control device 126 is provided with input signals 128, for example from the rotational speed sensor 108, the sensor 111, the sensor 114 and/or the rotational speed sensor control device 126 generates signals output signals, for example for actuating the internal combustion engine 102, the actuating device 110 of the clutch 104 and/or the actuating device 112 of the transmission 106.

Figure 2:
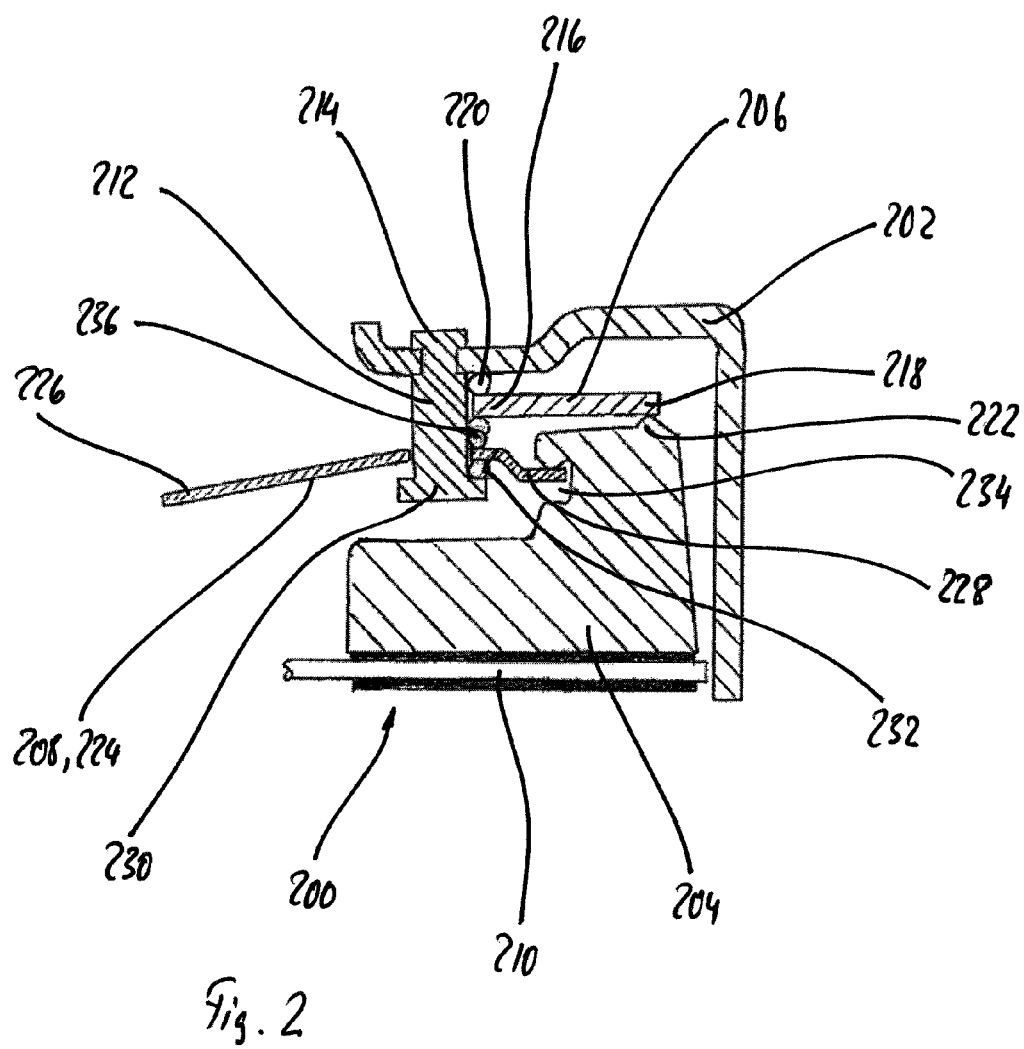
FIG. 2 shows a detailed view of a clutch having a housing, a pressure plate, a disk spring and a lever spring.

FIG. 2 shows a detailed view of a clutch 200, such as a clutch 104 according to FIG. 1, having a housing 202, a pressure plate 204, a disk spring 206 and a lever spring 208. The clutch 200 has an input part. The input part of the clutch 200 has the housing 200, the pressure plate 204 and a back-pressure plate (not shown here). The back-pressure plate is connected fixedly to the housing 202. The pressure plate 204 is connected to the housing 202 such that it can be displaced axially and is fixed to said housing 202 as to rotate with it. The clutch. 200 has an output part. The output part of the clutch 200 has a clutch plate 210. The clutch plate 210 has friction linings. A lining spring is arranged between the friction linings. The clutch plate 210 can be clamped between the pressure plate 204 and the back-pressure plate. An actuation of the clutch 200 takes place way of axial displacement of the pressure plate 204.

Rivets, such as 212, are arranged on the housing 202. The rivets 212 are arranged such that they are directed inwardly toward the pressure plate 204. A plurality of rivets 212 are arranged such that they are distributed over the circumference of the clutch 200. The rivets 212 are arranged such that they are distributed uniformly over the circumference of the clutch 200. Openings for receiving the rivets 212 are provided in the housing 202. The rivets 212 are held in the openings in each case by way of a rivet head, such as 214.

The disk spring 206 has a shape in the manner of a flat ring. The disk spring 206 has a radially inner edge section 216. The disk spring 206 has a radially outer edge section 218. The disk spring 206 bears with its radially inner edge section 216 against the rivets 212 and is centered with respect to the rotational axis of the clutch 200 with the aid of the rivets 212 wire ring 220 for the pivotable mounting of the disk spring 206 is arranged in the direction of the rotational axis of the clutch 200 between the disk spring 206, in particular the radially inner edge section 216 of the disk spring 206, and the housing 202.

The pressure plate 204 has a supporting section 222. The supporting section 222 is configured as a support in the manner of a ring or a ring section which projects toward the disk spring 206 in the direction of the rotational axis of the clutch 200. The disk spring 206 rests with its radially outer edge section 218 on the supporting section 222 of the pressure plate 204.

The lever spring 208 has levers, such as 224, which are directed in the radial direction. The levers 224 are connected to one another with the aid of a force edge. The levers 224 in each case have a radially inner lever end. 226 and a radially outer lever end 228. The levers 224 are fastened to the rivets 212. The levers 224 have openings for fastening to the rivets 212. The rivets 212 have rivet heads, such as 230, for fastening the lever spring 208. The rivets 212 are arranged in the openings of the lever 224. A wire ring 232 for pivotably mounting the lever spring 208 is arranged in the direction of the rotational axis of the clutch 200 between the lever spring 208 and the rivet heads 230.

The pressure plate 204 has a receiving section 234. The receiving section 234 is directed radially inwardly. The receiving section 234 has a groove-like shape. The receiving section 234 is configured so as to be continuous or interrupted in the circumferential direction. The receiving section 234 has bearing sections in the direction of the rotational axis of the clutch 200. The levers 224 of the lever spring 208 are received with their radially out lever ends 228 in the receiving section 234 of the pressure plate 204. The lever ends 228 bear against theearing sections of the receiving section 234. The lever ends 228 are received without play.

An undulating wire ring 236 for pivotable mounting is arranged between the lever spring 208 and the disk spring 206. With the aid of the wire ring 236, the lever spring 208 and the disk spring are supported on one another in an elastically prestressed manner. The wire rings 220, 234, 236 bear against the rivets 212 and are centered with respect to the rotational axis of the clutch 200 with the aid of the rivets 212.

A pressing force is applied to the pressure plate 204 substantially with the aid of the disk spring. The pressure plate 204 can be displaced with the aid of the disk spring 206 in order to actuate the clutch 200. The clutch 200 is self-closing under the loading of the force of the disk spring 206. On account of the force of the disk spring 206, the clutch plate 210 is clamped between the pressure plate 204 and the back-pressure plate in the engaged state, and the input part and the output part of the clutch 200 are drive connected to one another.

In order to disengage the clutch 200, the radially inner lever ends 226 of the levers 224 of the lever spring 208 are loaded. The levers 224 pivot about the pivoting bearings which are formed by way of the wire rings 232, 236. The pressure plate 204 raises up from the back-pressure plate counter to the force of the disk spring 206, and a drive connection between the input part and the output part of the clutch 200 is disconnected. A first lever arm of the levers 224 is formed between an acting location of the actuating device, such as disengagement bearing, and the pivoting bearing. A second lever arm of the levers 224 is formed between the pivoting bearing and the bearing section of the receiving section 234 of the pressure plate 204.

While specific embodiments of the invention have been shown and described in detail to illustrate the inventive principles, it will be understood that the invention may be embodied otherwise without departing from such principle.

We claim:

1. A friction clutch device for a drive train of a motor vehicle, comprising:
 a housing;
 a pressure plate rotatable about an axis of rotation of the friction clutch device, the pressure plate being axially displaceable relative to the housing in a direction of the axis of rotation, the pressure plate including a radial inner surface including bearing sections, the pressure plate including an axial support surface forming a supporting section facing the housing;

a spring device for loading the pressure plate, the spring device having a first element generating a pressure force that acts on the pressure plate, and a second element for transmitting an actuating force to the pressure plate, the second element being structurally separate from the first element, the first element configured for contacting the axial support surface to force the pressure plate toward a clutch disc, the second element including at least one lever for bearing against the bearing sections of the radial inner surface of the pressure plate, the first element being a disk spring that generates the pressure force between the housing and the pressure plate; and rivets arranged on the housing, the disk spring being centered by at least one of the rivets and including an outer edge section contacting the axial support surface of the pressure plate.

2. The friction clutch device of claim 1, wherein the disk spring has no tongues.

3. The friction clutch device of claim 1, further comprising an actuating device, the at least one lever acting between the actuating device and the pressure plate.

4. The friction clutch device of claim 3, wherein the pressure plate has a groove on the radial inner surface into which the at least one lever engages, the bearing sections being formed on different axial sides of the groove.

5. The friction clutch device of claim 3, wherein the second element is arranged on the rivets.

6. The friction clutch device of claim 1, wherein the first element acts on the pressure plate on a first diameter and the second element acts on the pressure plate on a second diameter, and the first diameter is greater than the second diameter.

7. The friction clutch device of claim 1, further comprising a resilient pivoting bearing element arranged between the first element and the second element.

8. The friction clutch device of claim 1, wherein the rivets include rivet heads arranged on the housing, a pivoting bearing element arranged between the first element and the housing, and another pivoting bearing element arranged between the second element and the rivet heads.

9. The friction clutch device of claim 1, wherein the second element is arranged on the rivet.

10. The friction clutch device of claim 9, further comprising a resilient pivoting bearing element arranged between the first element and the second element.

11. The friction clutch device of claim 1, further comprising the clutch disc, the pressure being axially between the first element and the clutch disc.

12. The friction clutch device of claim 11, wherein the first element actuates the clutch disc via the pressure plate such that the friction clutch device is self-closing under a loading of the force of the first element.

13. The friction clutch device of claim 12, wherein the at least one lever is configured such that loading a radially inner end of the at least one lever disengages the friction clutch device.

14. The friction clutch device of claim 13, further comprising a pivoting bearing, the at least one lever pivoting about the pivoting bearing during the loading the radially inner end of the at least one lever to disengage the friction clutch device.

15. A friction clutch device for a drive train of a motor vehicle, comprising:

a housing;

a pressure plate rotatable about an axis of rotation of the friction clutch device, the pressure plate being axially displaceable relative to the housing in a direction of the axis of rotation, the pressure plate including a radial inner surface including bearing sections, the pressure plate including an axial support surface forming a supporting section facing the housing;

a spring device for loading the pressure plate, the spring device having a first element generating a pressure force that acts on the pressure plate, and a second element for transmitting an actuating force to the pressure plate, the second element being structurally separate from the first element, the first element configured for contacting the axial support surface to force the pressure plate toward a clutch disc, the second element including at least one lever for bearing against the bearing sections of the radial inner surface of the pressure plate; and a resilient pivoting bearing element arranged between the first element and the second element.

16. The friction clutch device of claim 15, wherein the first element is a disk spring that generates the pressure force between the housing and the pressure plate.

17. The friction clutch device of claim 15, further comprising an actuating device, the at least one lever acting between the actuating device and the pressure plate.

18. The friction clutch device of claim 17, wherein the pressure plate has a groove on the radially inner into which the at least one lever engages, the bearing sections being formed on different axial sides of the groove.

19. The friction clutch device of claim 18, further comprising rivets arranged on the housing, the second element being arranged on the rivets.

20. The friction clutch device of claim 15, wherein the first element acts on the pressure plate on a first diameter and the second element acts on the pressure plate on a second diameter, and the first diameter is greater than the second diameter.

* * * * *